US010809990B2

(12) United States Patent
Wang et al.

(10) Patent No.: US 10,809,990 B2
(45) Date of Patent: Oct. 20, 2020

(54) ELECTRONIC SYSTEM, METHOD FOR INSTRUCTING INSTALLATION OF ELECTRONIC SYSTEM, AND COMPUTER PROGRAM PRODUCT

(71) Applicant: HTC Corporation, Taoyuan (TW)

(72) Inventors: Ying-Jing Wang, Taoyuan (TW); Yi-Hsin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/120,309

(22) Filed: Sep. 3, 2018

(65) Prior Publication Data

US 2020/0073646 A1    Mar. 5, 2020

(51) Int. Cl.
*G06F 8/60* (2018.01)
*B65D 85/38* (2006.01)
*G06F 3/14* (2006.01)

(52) U.S. Cl.
CPC . *G06F 8/60* (2013.01); *G06F 3/14* (2013.01)

(58) Field of Classification Search
None
See application file for complete search history.

(56) References Cited

U.S. PATENT DOCUMENTS

| 9,975,679 B2* | 5/2018 | Hulliger | B65D 75/527 |
| 2007/0115125 A1* | 5/2007 | Lyon | G06K 7/0008 340/572.1 |
| 2013/0232924 A1* | 9/2013 | Bergman | G05B 19/4183 53/507 |
| 2016/0225707 A1* | 8/2016 | Fei | H01L 21/4853 |
| 2016/0309603 A1* | 10/2016 | Tsai | B65D 51/24 |
| 2017/0134933 A1* | 5/2017 | Padmanabhan | H04W 8/22 |
| 2017/0346802 A1* | 11/2017 | Gruskin | H04L 63/08 |
| 2018/0011477 A1* | 1/2018 | Barlier | B65D 81/058 |
| 2019/0102334 A1* | 4/2019 | Berchanskiy | G06F 3/14 |

FOREIGN PATENT DOCUMENTS

CN    109190960 A    *    1/2019

* cited by examiner

*Primary Examiner* — Daxin Wu
(74) *Attorney, Agent, or Firm* — JCIPRNET

(57) ABSTRACT

The disclosure provides an electronic system, a method for instructing an installation of the electronic system, and a computer program product. The electronic system includes a plurality of electronic device sets, a packing box, and a printed matter. The packing box is segmented into a plurality of containing packages, wherein each of the containing packages contains one of the electronic device sets, and the containing packages are labelled with a plurality of sequential numbers corresponding to an installation order of the electronic device sets contained therein. The printed matter is printed with downloading information related to installation software for providing a plurality of installation instructions of sequentially installing the electronic device sets one by one after being installed with the installation software.

19 Claims, 17 Drawing Sheets

ELECTRONIC SYSTEM, METHOD FOR INSTRUCTING INSTALLATION OF ELECTRONIC SYSTEM, AND COMPUTER PROGRAM PRODUCT

BACKGROUND OF THE INVENTION

1. Field of the Invention

The present disclosure generally relates to an electronic system, a method for instructing an installation of the electronic system, and a computer program product, in particular, to an electronic system, a method for instructing an installation of the electronic system, and a computer program product for improving the out-of-box experience (OOBE) of users.

2. Description of Related Art

Presently, virtual reality (VR) systems are provided to consumers in a disassembled state. Typically, consumers may wish to set-up VR systems themselves due to high costs and scheduling problems associated with having a technician complete installation.

To set-up a VR system, the user may physically take the components (e.g., base stations, a link box, a head-mounted display (HMD), controllers, and the connection lines thereof) of the VR system out of the packing box, connect the components and then initiate start-up procedures. However, since all of the components of the VR system are disposed in a common space of the packing box, which may make the user confused about which parts of the components should be assembled/connected/used while installing each of the components. As a result, the OOBE of the user may be deteriorated.

Generally, the OOBE may refer to the process of establishing the VR system or software program into an operating state. The OOBE provides insightful information because it is, typically, one of the first interactions between the user and the VR system, therefore the user may form opinions based on this experience. The user's opinions may carry over to their overall impression of the VR system, the advice they convey to associates, and to future purchases they may make. Furthermore, difficulties occurring during the out-of-box process may trigger a help-line call which may lead to user anxiety and require costly help-line staffing.

Therefore, it would be desirable to provide a system and method capable of improving a user's OOBE.

SUMMARY OF THE INVENTION

Accordingly, the disclosure provides an electronic system, a method for instructing an installation of the electronic system, and a computer program product for improving OOBE.

The disclosure provides an electronic system including a plurality of electronic device sets, a packing box, a printed matter, and a computing device. The packing box is segmented into a plurality of containing packages, wherein each of the containing packages contains one of the electronic device sets, and the containing packages are labelled with a plurality of sequential numbers corresponding to an installation order of the electronic device sets contained therein. The printed matter is printed with downloading information related to installation software for providing a plurality of installation instructions of sequentially installing the electronic device sets one by one.

The disclosure provides a method for instructing an installation of an electronic system, wherein the electronic system comprising a plurality of electronic device sets contained in a plurality of containing packages, wherein each of the containing packages contains one of the electronic device sets and labelled with a sequential number corresponding to an installation order of the electronic device set contained therein, and wherein the plurality of containing packages are contained in a packing box. The method includes: installing installation software, wherein downloading information related to the installation software for providing a plurality of installation instructions of sequentially installing a plurality of electronic device sets of the electronic system one by one is printed on a printed matter; and providing the installation instructions of sequentially installing the electronic device sets one by one corresponding to the sequential numbers labelled on the containing packages after the installation software has been installed.

The disclosure provides a computer program product for use in sequentially installing a plurality of electronic device sets of an electronic system, wherein the electronic system comprising a plurality of electronic device sets contained in a plurality of containing packages, wherein each of the containing packages contains one of the electronic device sets and labelled with a sequential number corresponding to an installation order of the electronic device set contained therein, and the plurality of containing packages are contained in a packing box, and wherein downloading information related to the computer program product is printed on a printed matter, the computer program product including an executable computer program mechanism embedded therein, the executable computer program mechanism comprising instructions for providing a plurality of installation instructions of sequentially installing the electronic device sets one by one corresponding to the sequential numbers labelled on the containing packages after the computing device has been installed with the installation software.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
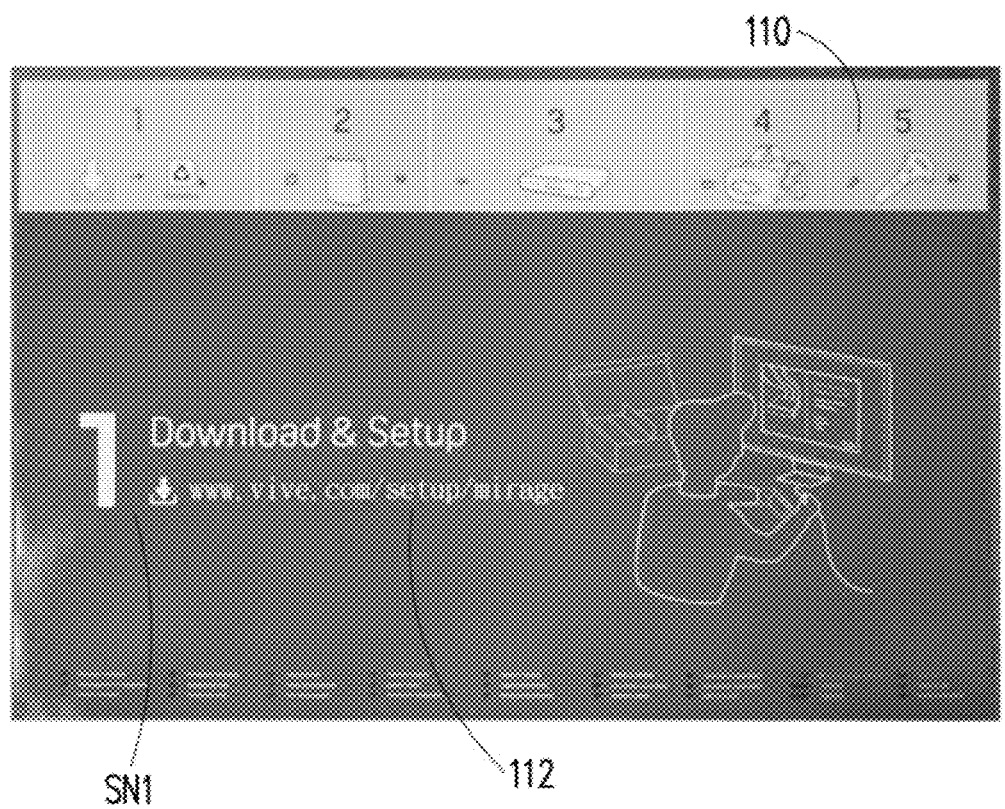
FIG. 1 shows a printed matter of an electronic system according to one exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
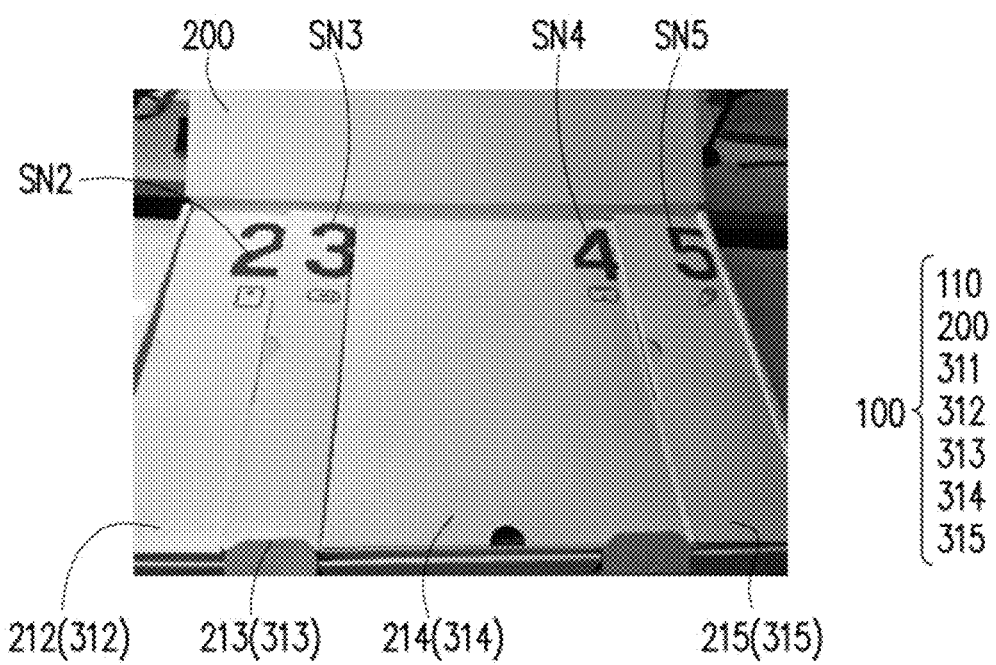
FIG. 2 shows a packing box of the electronic system according to one exemplary embodiment of the disclosure.
Figure 3:
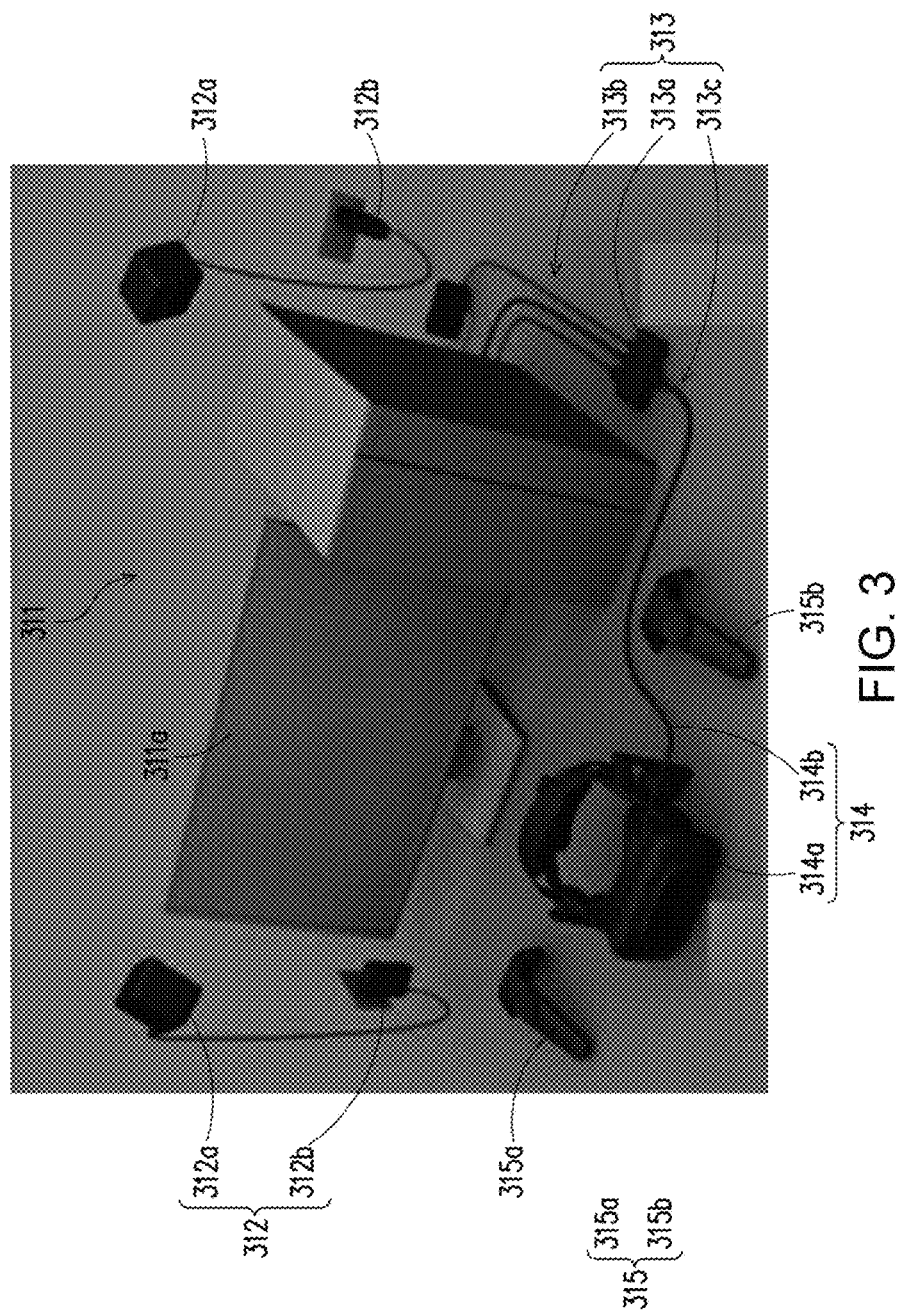
FIG. 3 shows a schematic view of a computing device and a plurality of electronic device sets of the electronic system according to one exemplary embodiment of the disclosure.

See FIG. 1, FIG. 2, and FIG. 3, wherein FIG. 1 shows a printed matter of an electronic system according to one exemplary embodiment of the disclosure, FIG. 2 shows a packing box of the electronic system according to one exemplary embodiment of the disclosure, and FIG. 3 shows a schematic view of a computing device and a plurality of electronic device sets of the electronic system according to one exemplary embodiment of the disclosure.

As exemplarily shown in FIG. 1 to FIG. 3, the electronic system 100 may be a VR system and include a plurality of electronic device sets 312, 313, 314, 315, a packing box 200, a printed matter 110, and a computing device 311.

The electronic device set 312 may be a position tracking component set, which may include base stations 312a and power supplies 312b. The electronic device set 313 may be a data transfer component set, which may include a link box 313a, a power supply 313b, and connection lines 313b for connecting the link box 313a with the computing device 311. The electronic device set 314 may be an HMD component set, which may include an HMD 314a and a connection line 314b for connecting the HMD 314a with the link box 313a. The electronic device set 315 may be a controller component set, which may include controllers 315a and 315b to be held by the user's hands.

In the following discussions, it is assumed that the electronic device sets 312-315 need to be sequentially installed for successfully initiating the VR system, but the disclosure is not limited thereto.

In the embodiment of the disclosure, the printed matter 110 and the electronic device sets 312-315 are packed in the packing box 200 before the user opens the packing box 200.

In detail, as shown in FIG. 1, the printer matter 110 may be printed with downloading information 112 (e.g., a website address) related to installation software for providing a plurality of installation instructions of sequentially installing the electronic device sets 312-315. Besides, the printed matter 110 may be printed with a sequential number SN1 of 1, which may represent that the installation software needs to be downloaded before installing the electronic device sets 312-315. In another embodiment, the download information 112 and the sequential number SN1 of 1 may be printed on the packing box 200, which means the packing box may also be the printed matter. In still another embodiment, the download information 112 and the sequential number SN1 of 1 may be sent to the user by an email, a message, or any other kinds of electronic documents.

Therefore, as the user opens the packing box 200, the user may firstly download the installation software by using the computing device 110 (which may be a personal computer or a laptop).

Next, as shown FIG. 2, the packing box 200 is segmented into a plurality of containing packages 212, 123, 214, and 215, and each of the containing packages 212-215 contains one of the electronic device sets 312-315. The containing packages 212-215 are labelled with a plurality of sequential numbers SN2, SN3, SN4, SN5 (i.e., 2 to 5) corresponding to an installation order of the electronic device sets 312-315 contained therein. In one embodiment, the containing packages may be containing boxes, and all of the containing boxes are put together in the package box. In another embodiment, the containing packages may be containing grids.

Based on the previous assumption that the electronic device sets 312-315 need to be sequentially installed for initiating the VR system, the electronic device sets 312-315 may be respectively contained in the containing packages 212-215, such that the sequential numbers SN2-SN5 may reflect the installation order of the electronic device sets 212-215. To be more specific, the electronic device set 312 (i.e., the position tracking component set) may be contained in the containing package 212, the electronic device set 313 (i.e., the data transfer component set) may be contained in the containing package 213, the electronic device set 314 (the HMD component set) may be contained in the containing package 214, and the electronic device set 315 (the controller component set) may be contained in the containing package 215.

By putting the electronic device sets 312-315 into the containing packages 212-215 based on the installation order instead of disposing the electronic device sets 312-315 in a common space of the packing box 200, the user would not be confused about which component should be taken out while installing each of the electronic device sets 312-315. As a result, the OOBE of the user may be improved.

In other embodiments, the disclosure further provides a method for instructing the installation of the electronic system 100, which may instruct the user to install the electronic system step-by-step. See the following for further discussions.

Figure 4:
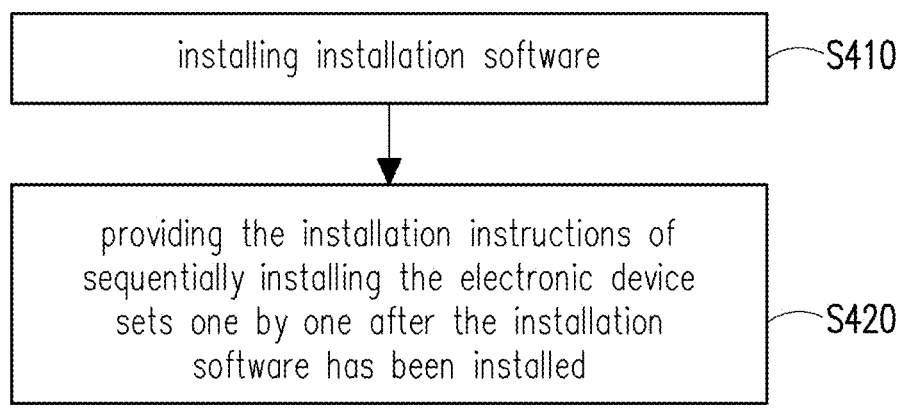
FIG. 4 shows a flow chart of the method for instructing the installation of the electronic system according to one exemplary embodiment of the disclosure.

FIG. 4 shows a flow chart of the method for instructing the installation of the electronic system according to one exemplary embodiment of the disclosure, and FIG. 5A to FIG. 9D show instructions for installing the electronic system according to exemplary embodiments of the disclosure. The method of FIG. 4 may be performed by the computing device 311 of the electronic system 100 of FIG. 1 to FIG. 3, and detailed description will be provided in accompanying with the components/devices in FIG. 1 to FIG. 3.

In step S410, the computing device 311 may install the installation software. Specifically, the installation software may be downloaded by the user based on, for example, the downloading information 112 in FIG. 1. As the installation software is executed by the computing device 311, a display 311a of the computing device 311 may show a window illustrated in FIG. 5A, which may instruct the user to install the installation software into a specified folder.

In step S420, the computing device 311 may provide a plurality of installation instructions of sequentially installing the electronic device sets 312-315 one by one after the computing device 311 has been installed with the installation software. In the following teachings, the installation instructions may be presented via the aspects exemplarily shown in FIG. 5B to FIG. 9D, but the disclosure is not limited thereto.

Figure 5A:
FIG. 5A to FIG. 9D show instructions for installing the electronic system according to exemplary embodiments of the disclosure.
Figure 5B:
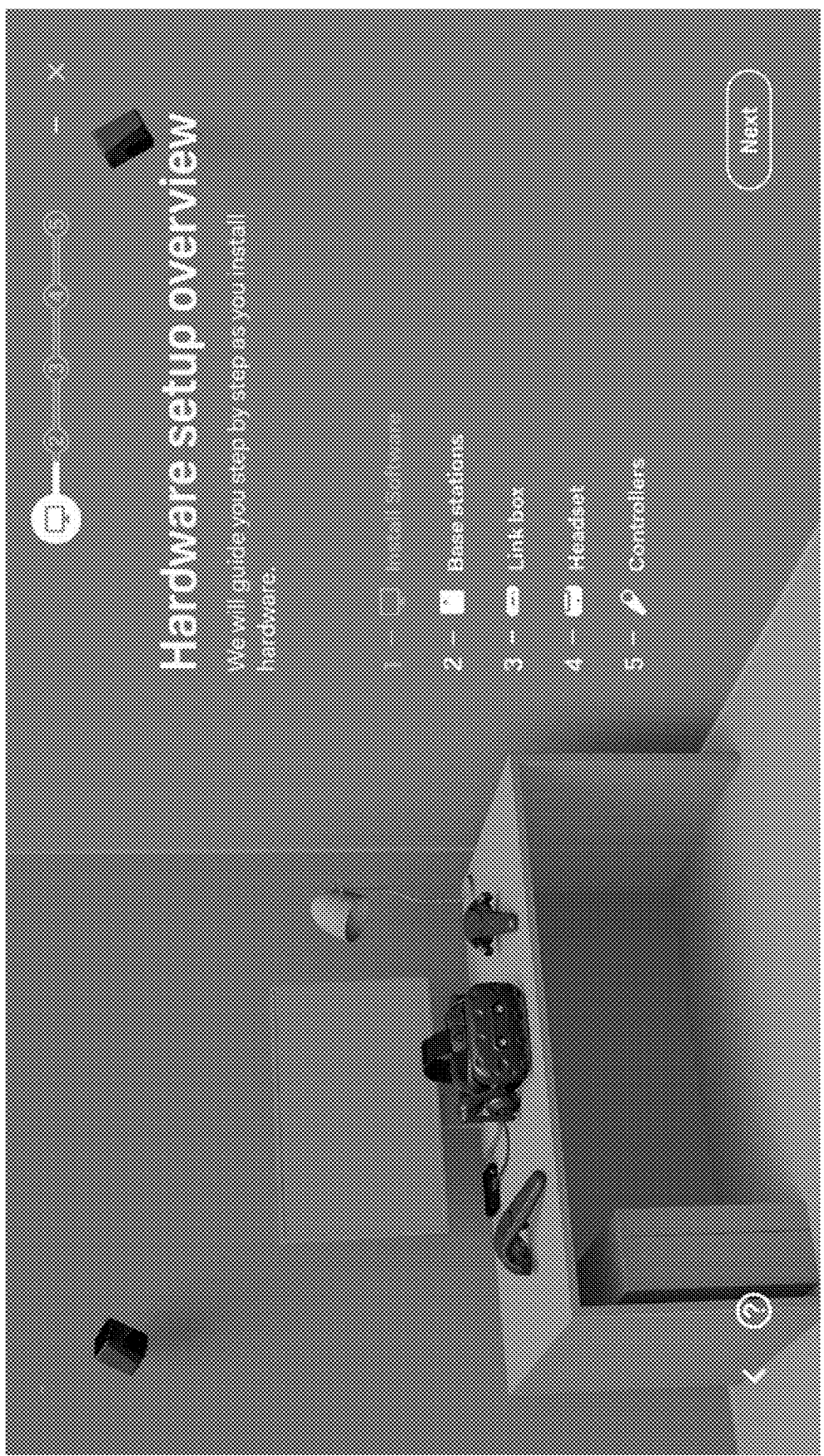

For example, after the installation software has been installed on the computing device 311, the display 311a of the computing device 311 may show a view of FIG. 5B. FIG. 5B shows a hardware setup overview, which shows five steps needed to be performed for installing the electronic device sets 312-315. Since the first step of installing the installation software has bee done, the related icon (i.e., "Install Software") may be darkened. Based on FIG. 5B, the user may know that the electronic device set 312 (i.e., the position tracking component set) should be installed subsequently, since the second step shows "Base station" with a sequential number of 2.

Figure 5C:
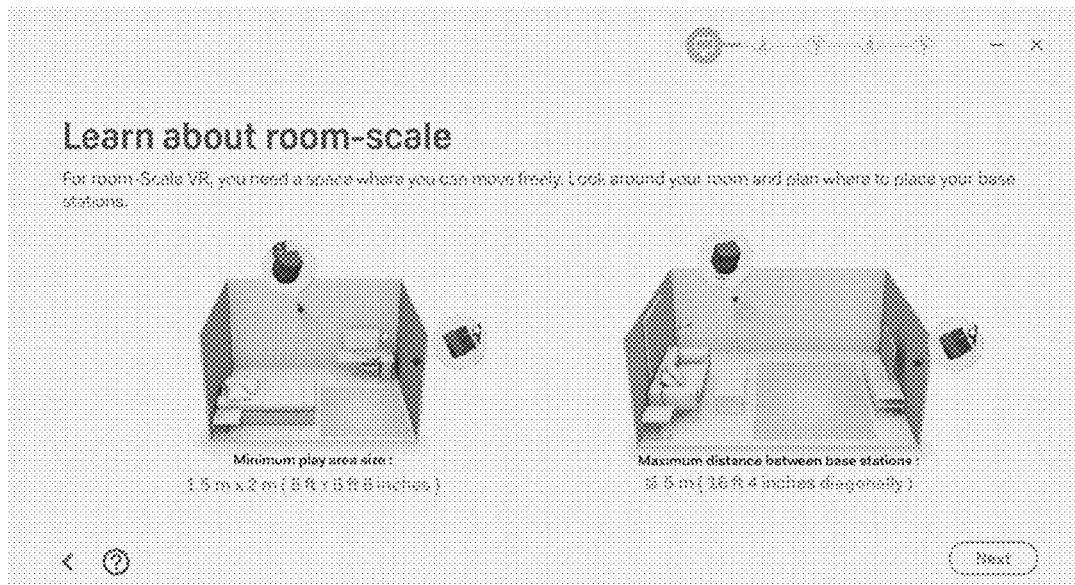
Figure 5D:
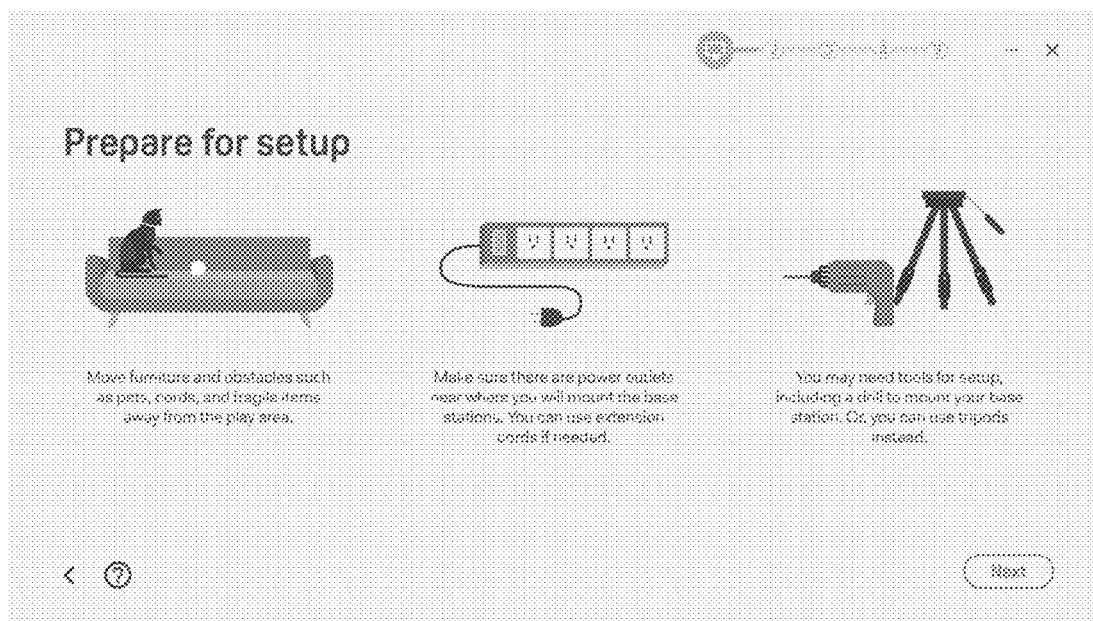

In other embodiments, the computing device 311 may show some basic installation knowledge about the electronic system, such as the basic installation knowledge in FIG. 5C and FIG. 5D, but the disclosure is not limited thereto.

Figure 6A:
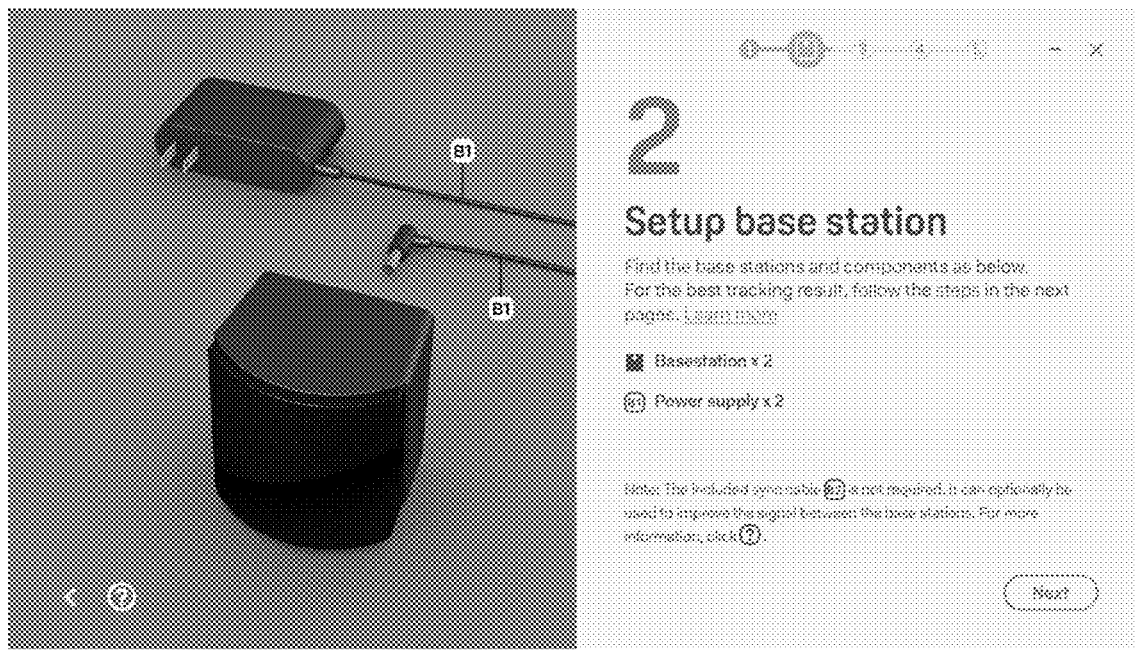
Figure 6B:
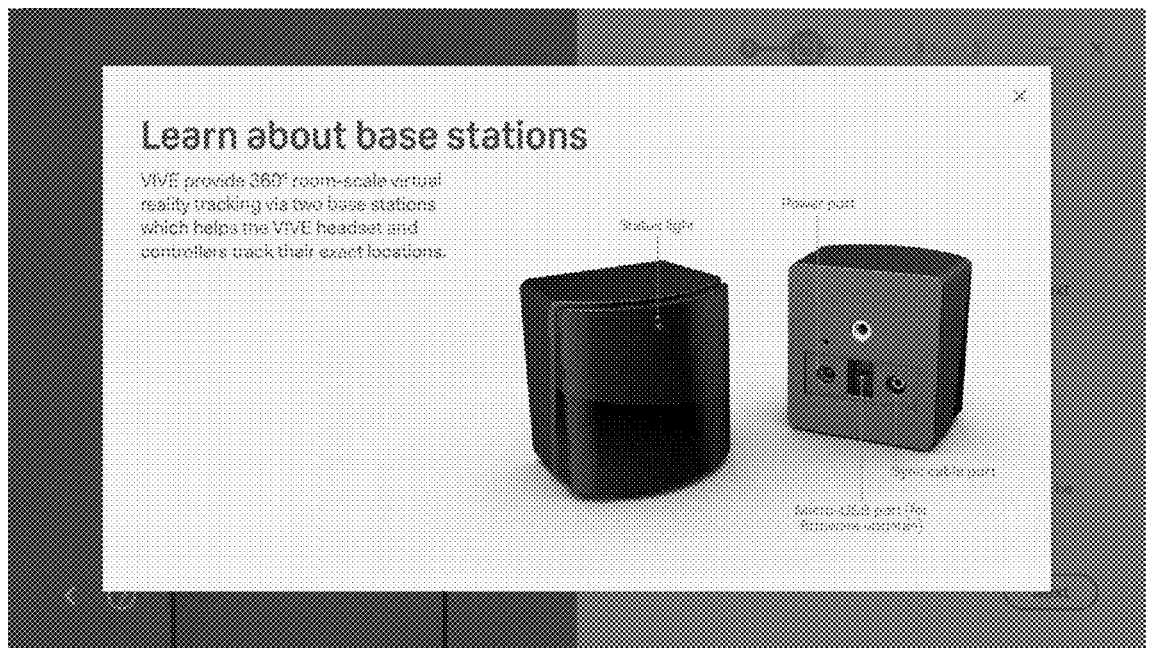
Figure 6C:
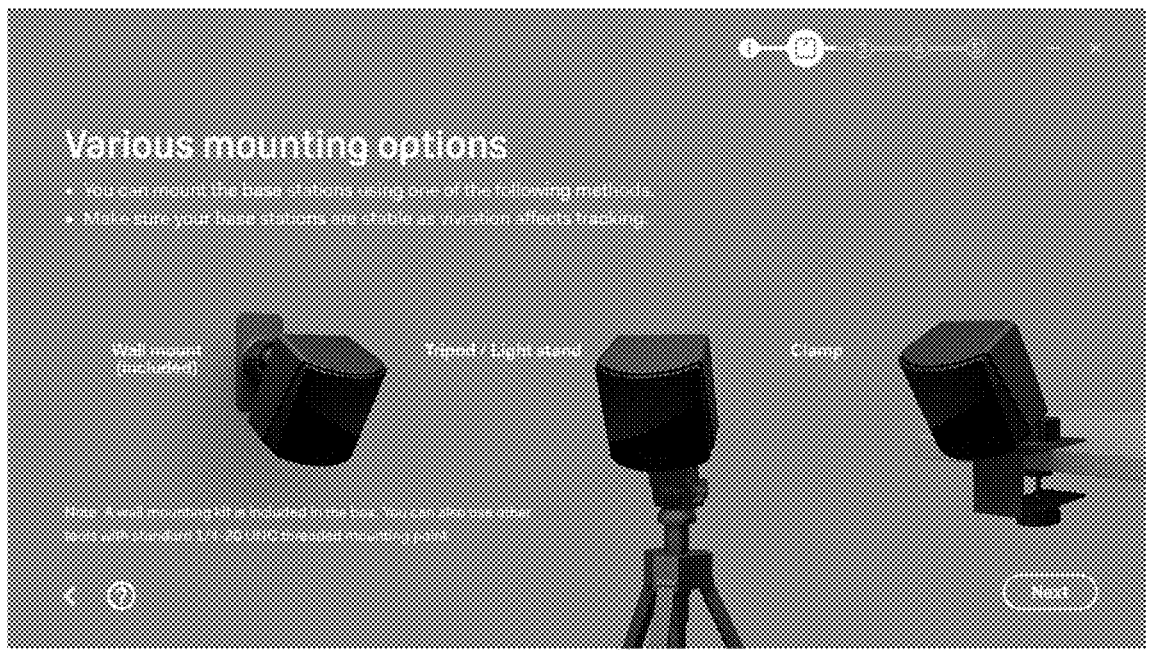
Figure 6D:
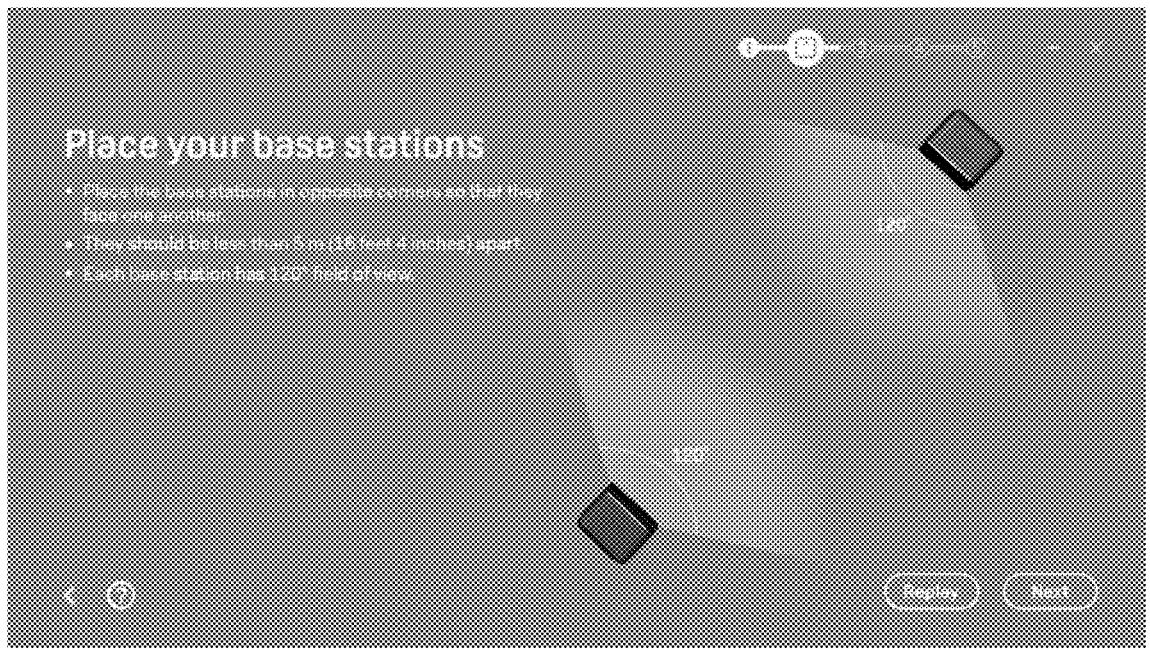
Figure 6E:
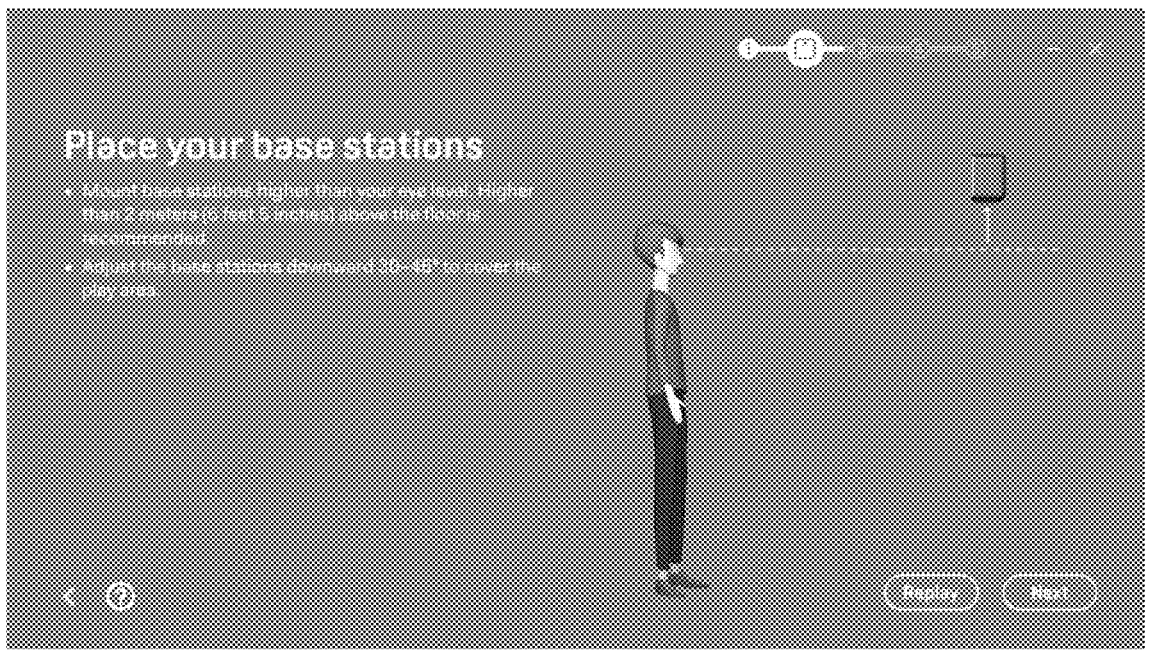

See FIG. 6A, the computing device 311 may instruct the user to find the electronic device set 312 (i.e., the 1$^{st}$ electronic device set to be installed) in the containing package 212 labelled with 2 (i.e., the sequential number SN2). Specifically, since the view of FIG. 6A clearly shows a sequential number of 2, the user may accordingly find the position tracking component set in the containing package 212 and install the electronic device set 312 based on the subsequent instructions, such as the instructions shown in FIG. 6B to FIG. 6F.

The electronic device set 312 may be a position tracking component set, which is a main part of a position tracking system in a VR system. In the embodiment, the electronic device set 312 may be a base station component set, which may include a base station 312a and a power supply 312b. The base station component set is a part of the positional tracking system used in a VR system, for example a lighthouse tracking system used in HTC Vive VR device series. In the embodiment, the base station component set include two base stations 312a and two power supplies 312b for the two base stations 312a.

In another embodiment, the electronic device set 312 (i.e., position tracking component set) may be a camera tracking component set, which may include a camera tracking component and a power supply. The camera tracking component set is a part of the positional tracking system used in a VR system, for example a camera tracking system used in PlayStation VR device series.

Figure 6F:
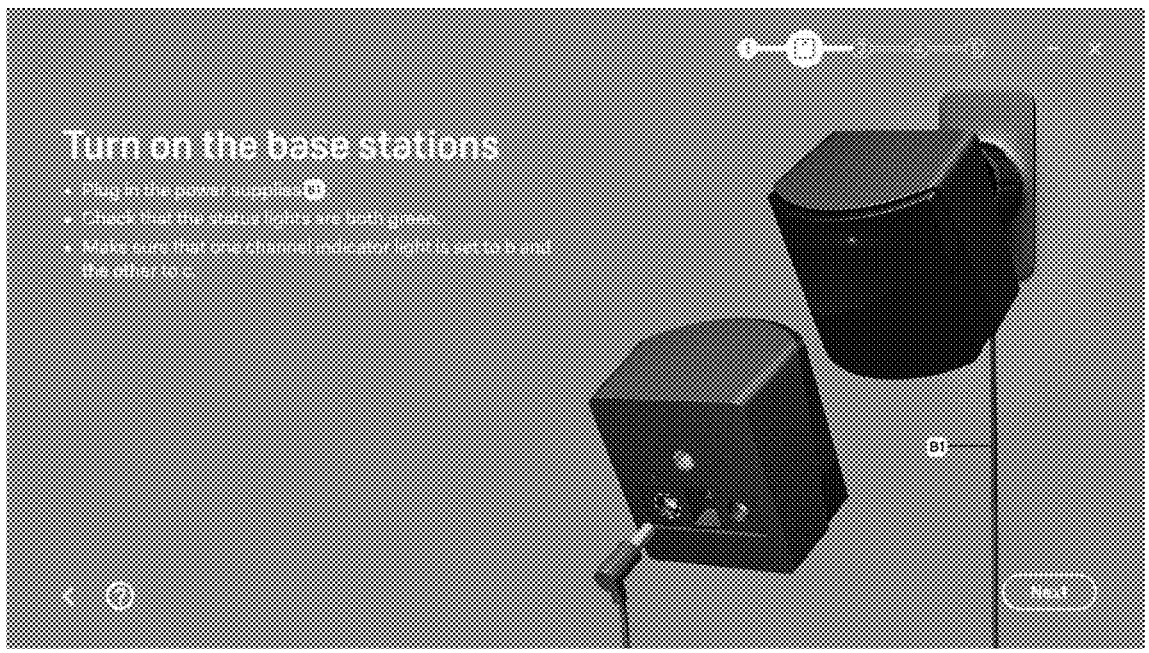
Figure 7A:
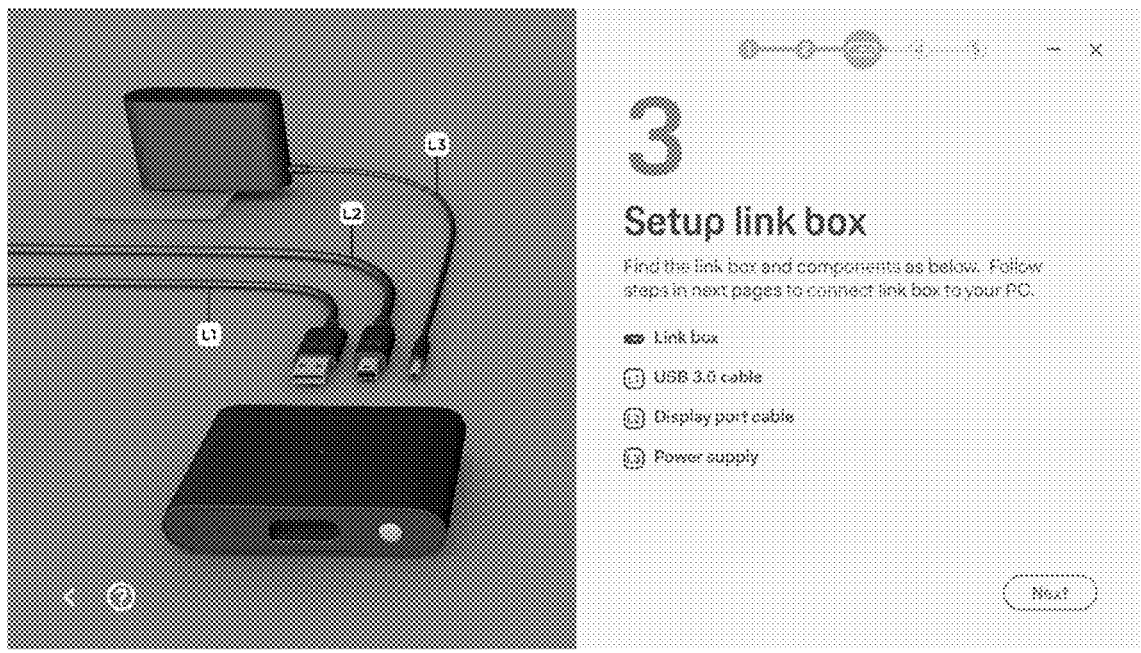
Figure 7B:

After the electronic device set 312 (i.e., the position tracking component set) has been confirmed to be installed by the user via, for example, pressing the button "Next" shown in FIG. 6F, the computing device 311 may control the display 311a to show a window of FIG. 7A to instruct the user to find the electronic device set 313 (i.e., the $2^{nd}$ electronic device set to be installed) in the containing package 213 labelled with 3 (i.e., the sequential number SN3). Specifically, since the view of FIG. 7A clearly shows a sequential number of 3, the user may accordingly find the data transfer component set in the containing package 213 and install the electronic device set 313 based on the subsequent instructions, such as the instructions shown in FIG. 7B to FIG. 7C.

The electronic device set 313 may be a data transfer component set used for connecting the computing device 311 with the HMD 314a. In the embodiment, the electronic device 313 may be a link box component set, which may include the link box 313a, the power supply 313b, and connection lines 313b for connecting the link box 313a with the computing device 311. In another embodiment, the link box 313a may be powered by the computing device 311 and the link box component set may not include the power supply 313b. In still another embodiment, the electronic device set 313 (i.e., data transfer component set) may be a wireless adaptor component set for wireless connecting with the HMD 314a, and the wireless adaptor component set may include wireless adaptor but not include a connection line.

Figure 7C:
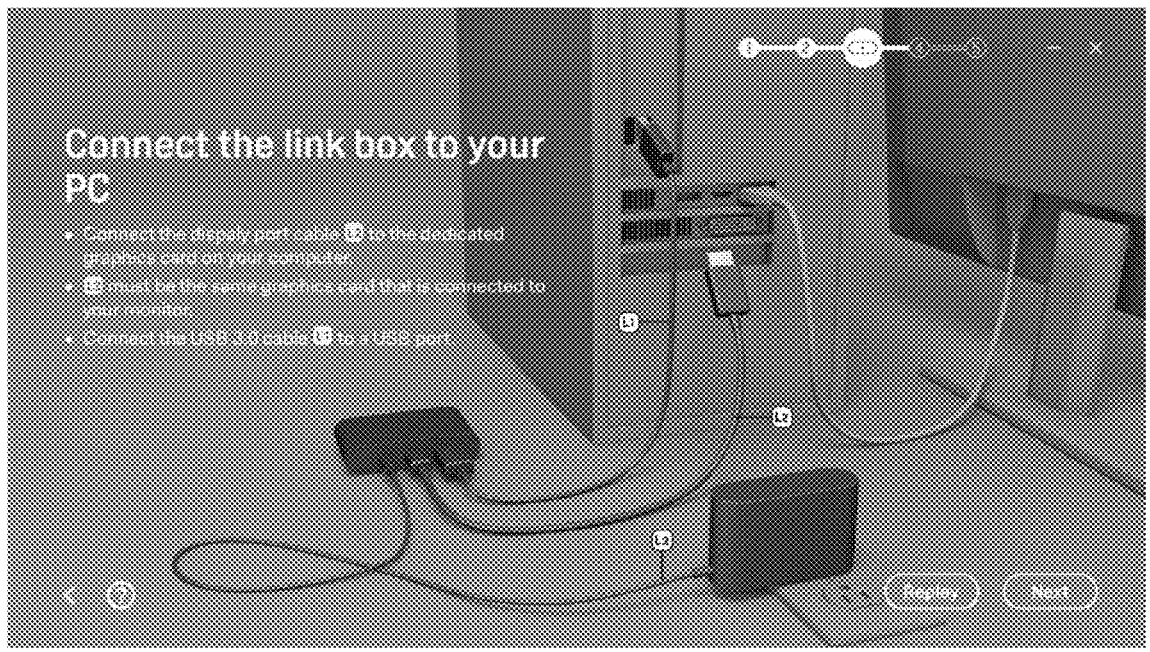
Figure 8A:
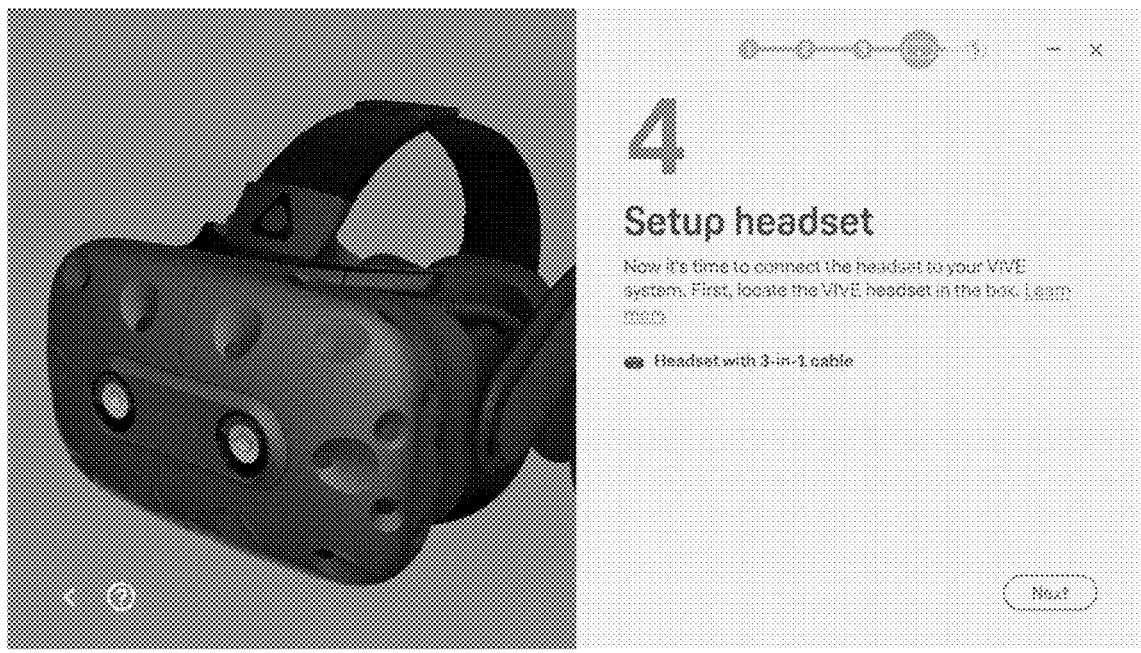
Figure 8B:
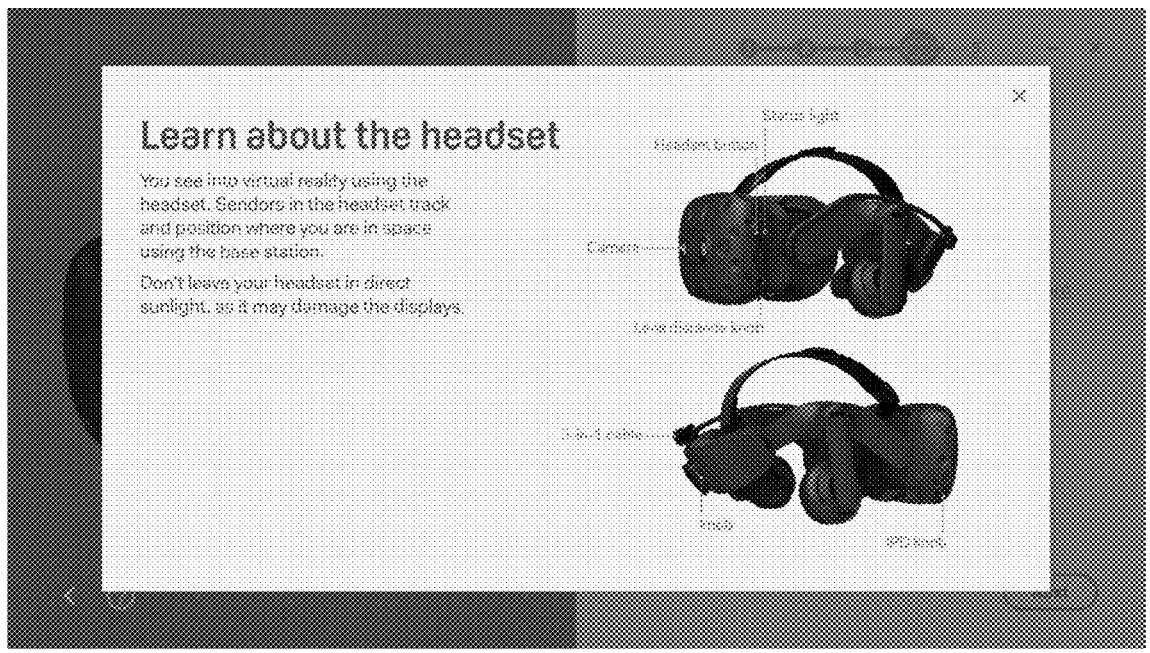
Figure 8C:
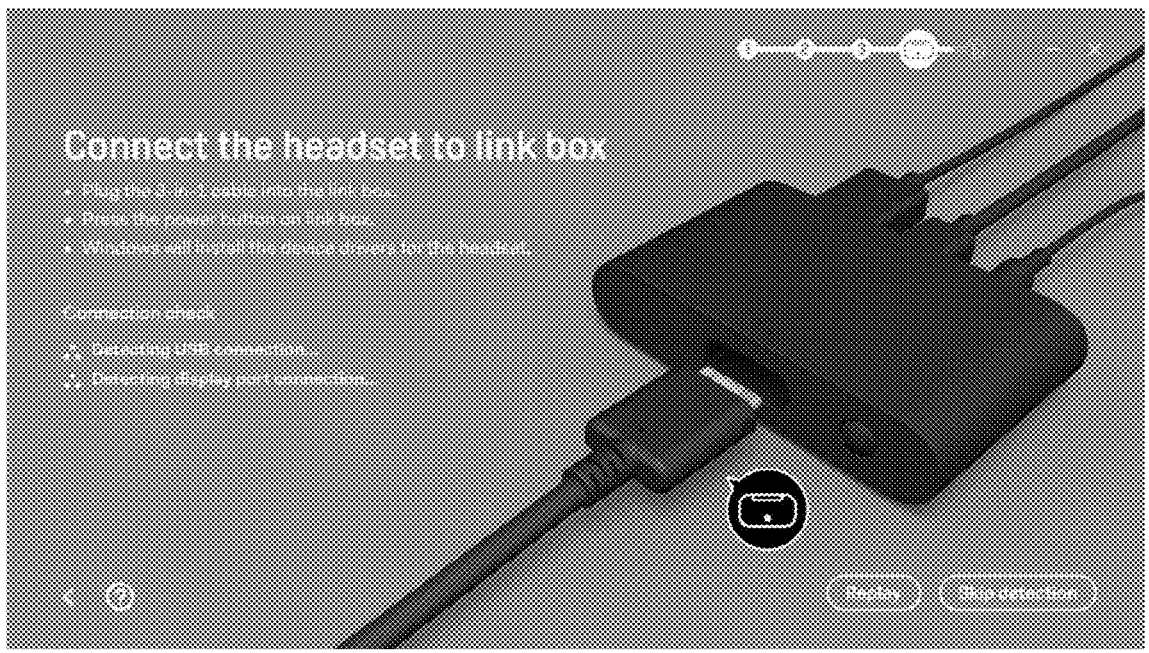
Figure 8D:
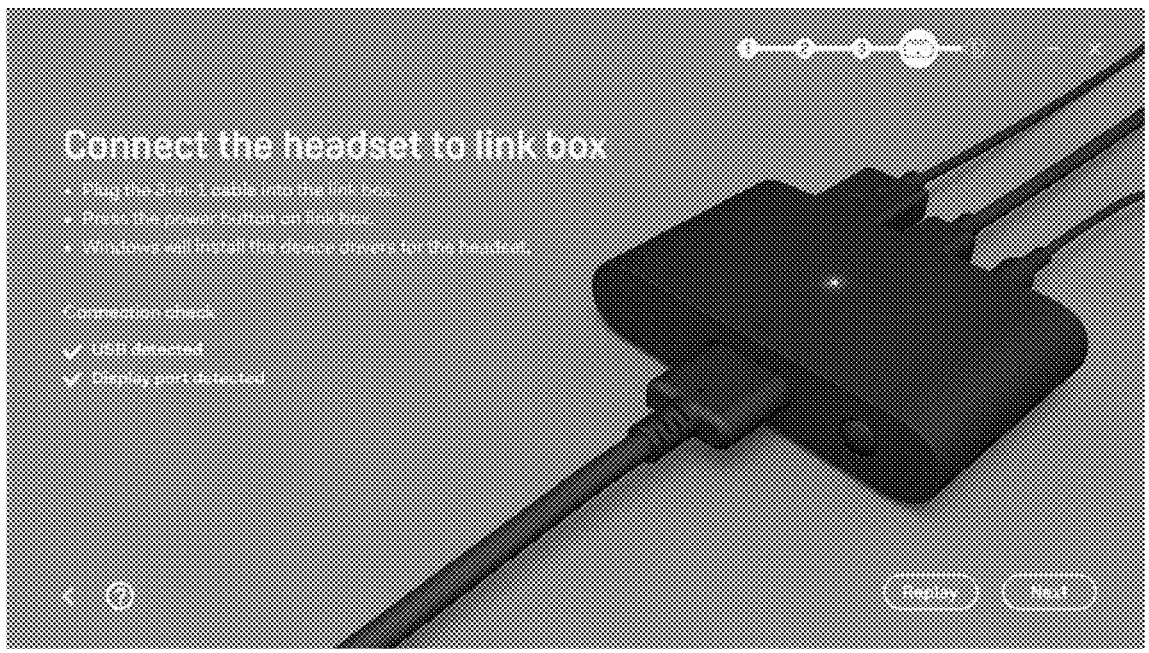
Figure 8E:

After the electronic device set 313 (i.e., the data transfer component set) has been confirmed to be installed by the user via, for example, pressing the button "Next" shown in FIG. 7C, the computing device 311 may control the display 311a to show a window of FIG. 8A to instruct the user to find the electronic device set 314 (i.e., the $3^{rd}$ electronic device set to be installed) in the containing package 214 labelled with 4 (i.e., the sequential number SN4). Specifically, since the view of FIG. 8A clearly shows a sequential number of 4, the user may accordingly find the HMD component set in the containing package 214 and install the electronic device set 314 based on the subsequent instructions, such as the instructions shown in FIG. 8B to FIG. 8F.

Figure 8F:
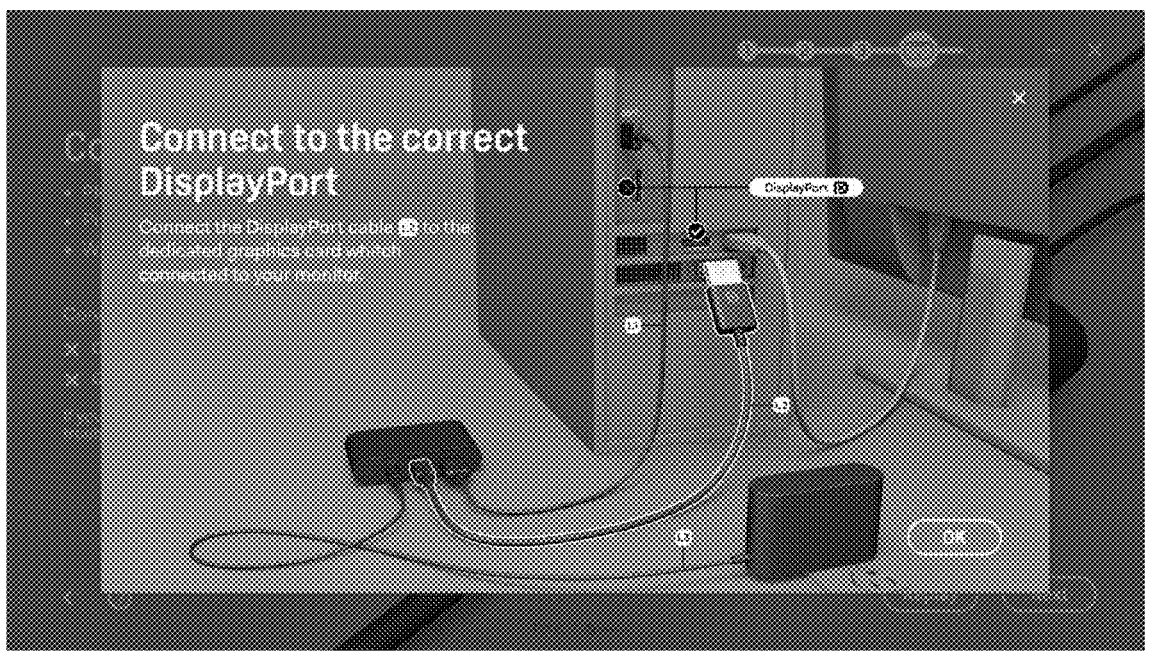
Figure 8G:
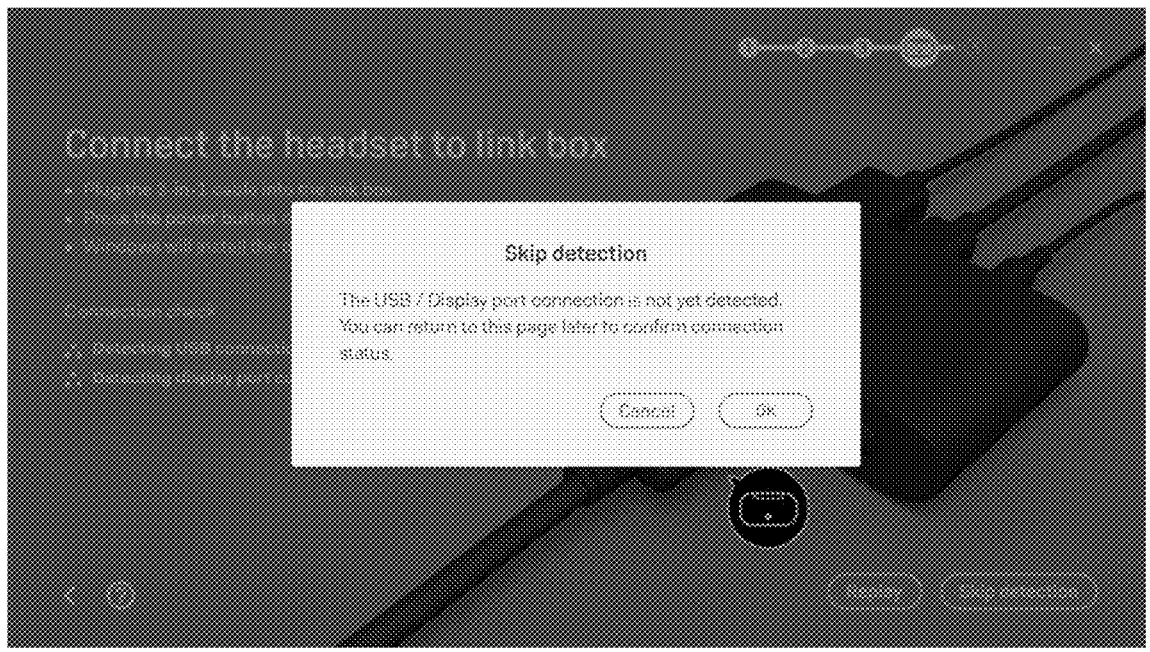

In one embodiment, the installation software may check whether a connection status of the HMD component set is normal via the window shown in FIG. 8G. If the connection status of the HMD component set is normal, a first notification may be generated accordingly for subsequently installing the controller component set (i.e., the electronic device set 315); otherwise, e a second notification may be generated accordingly for checking whether the position tracking component set, the data transfer component set, and the HMD set are properly installed.

In the embodiment, the HMD component set may include the HMD 314a and the connection line 314b for connecting the HMD 314a with the link box 313a. In another embodiment, the HMD may wireless connecting with the wireless adaptor and the HMD component set may not include the connection line 314b.

Figure 9A:
Figure 9B:
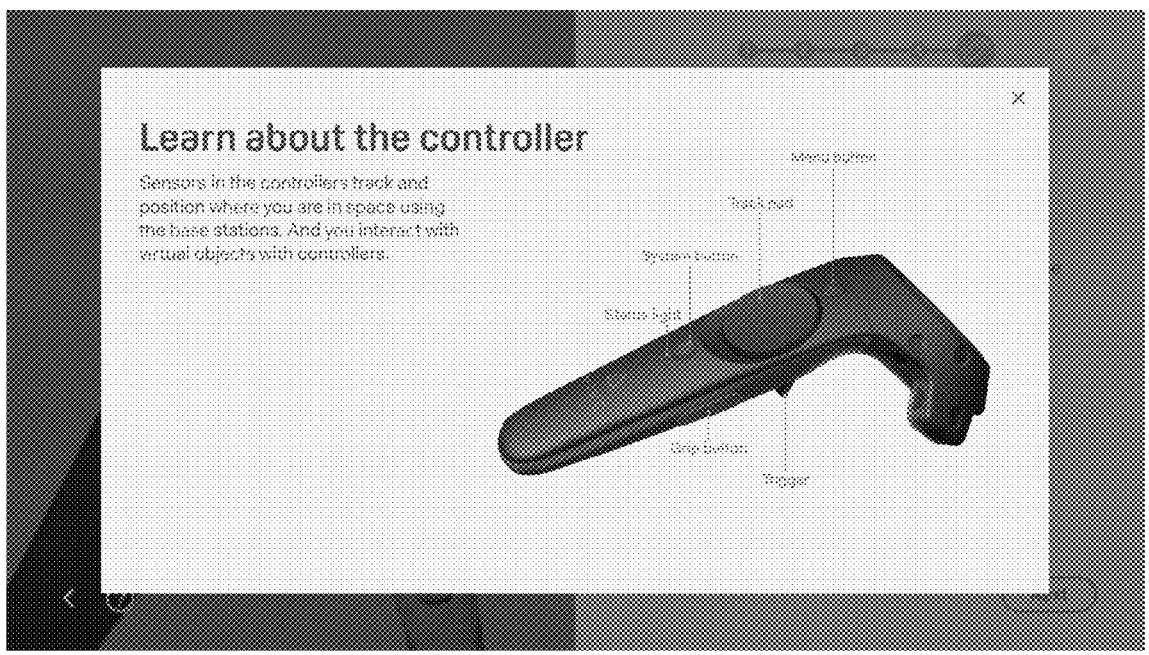
Figure 9C:
Figure 9D:

After the electronic device set 314 (i.e., the HMD component set) has been confirmed to be installed by the user via, for example, pressing the button "OK" shown in FIG. 8F (or FIG. 8G), the computing device 311 may control the display 311a to show a window of FIG. 9A to instruct the user to find the electronic device set 315 (i.e., the 4th electronic device set to be installed) in the containing package 215 labelled with 5 (i.e., the sequential number SN5). Specifically, since the view of FIG. 8A clearly shows a sequential number of 5, the user may accordingly find the controller component set in the containing package 215 and install the electronic device set 315 based on the subsequent instructions, such as the instructions shown in FIG. 9B to FIG. 9D.

As a result, the user may finish the installation of the electronic system 100 in an easier and more intuitive way, such that the OOBE of the user may be improved.

Despite the above teachings use the VR system as an example to clarify the concepts of the disclosure, the concept of the disclosure should not be interpreted to be limited thereto. In other electronic system including a plurality of electronic device sets, for example a home theatre system, a gaming system, a household IoT (Internet of Things) system, people with ordinary skills in the art may accordingly improve the OOBE of the user base on the teachings of the previous embodiments.

For example, a printed matter printed with downloading information related to installation software and a sequential number of 1 (which represents that the installation software needs to be downloaded before installing the electronic device sets) may be still provided in the packing box. If a total number of the electronic device sets is N, the sequential numbers labelled on the containing packages of the packing box may be a plurality of integers from 2 to (N+1). Under this circumstance, an $i^{th}$ electronic device set of the electronic device sets may be contained in one of the containing packages labelled with (i+1), wherein i is an integer between 1 and N.

After the installation software has been installed on the computing device, the computing device may instruct to find a $1^{st}$ electronic device set of the electronic device sets in one of the containing packages labelled with 2. After the $1^{st}$ electronic device set has been confirmed to be installed, the computing device may instruct to find a $2^{nd}$ electronic device set of the electronic device sets in one of the containing packages labelled with 3. Generally speaking, after the $i^{th}$ electronic device set has been confirmed to be installed, the computing device may instruct to find an $(i+1)^{th}$ electronic device set of the electronic device sets in one of the containing packages labelled with (i+2).

Therefore, the OOBE of the user about installing the other electronic system may be improved for giving simpler and more intuitive instructions while the user sequentially installing the electronic device sets.

The present disclosure further provides a computer program product for executing method for instructing the installation of the electronic system. The computer program product is composed of a plurality of program instructions (for example, a setting program instruction and a deployment program instruction) embodied therein. These program instructions can be loaded into an electronic device and executed by the same to execute the method for instructing the installation of the electronic system and the functions of the electronic device described above.

To sum up, the electronic system, the method, and the computer program product of the disclosure provides a mechanism about distributing the electronic device sets in different containing packages of the packing box, which reduces the burden of the user finding the required components for installation. Meanwhile, by providing proper instructions corresponding to the sequential numbers labelled on the containing packages, the difficulties of installing the electronic system may be further lowered. Consequently, the OOBE of the user about installing the electronic system may be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An electronic system, comprising:
a plurality of electronic device sets, wherein the electronic device sets need to be installed according to an installation order to collaboratively initiate a specific service provided by the electronic system, wherein the electronic system is a virtual reality system;
a packing box, segmented into a plurality of containing packages, wherein each of the containing packages contains one of the electronic device sets, and the containing packages are labelled with a plurality of sequential numbers corresponding to the installation order of the electronic device sets contained therein, wherein the containing packages are sequentially arranged in the packing box based on the sequential numbers, wherein the electronic devices sets comprises a position tracking component set, a data transfer component set, a head-mounted display component set, and a controller component set; and
a printed matter, printed with downloading information related to installation software for providing a plurality of installation instructions of sequentially installing the electronic device sets one by one, wherein the printed matter is printed with a number of 1, which represents that the installation software needs to be downloaded before installing the electronic device sets.

2. The electronic system of claim 1, wherein the containing packages comprise a first containing package for containing the position tracking component set, a second containing package for containing the data transfer component set, a third containing package for containing the head-mounted display component set, and a fourth containing package for containing the controller component set, wherein the first containing package, the second containing package, the third containing package, and the fourth containing package are sequentially labelled with the sequential numbers from 2 to 5.

3. The electronic system of claim 2, wherein after the installation software has been installed, instructions with sequential numbers from 2 to 5 corresponding to the containing package will be provided step by step.

4. The electronic system of claim 2, wherein after the position tracking component set, the data transfer component set, and the head-mounted display component set are sequentially installed, the installation software checks whether a connection status of the head-mounted display component set is normal;
if yes, a first notification for subsequently installing the controller component set will be generated accordingly; and
if no, a second notification for checking whether the position tracking component set, the data transfer component set, and the head-mounted display component set are properly installed will be generated accordingly.

5. The electronic system of claim 1, wherein a total number of the electronic device sets is N, and the sequential numbers labelled on the containing packages comprise a plurality of integers from 2 to (N+1).

6. The electronic system of claim 5, wherein an $i^{th}$ electronic device set of the electronic device sets is contained in one of the containing packages labelled with (i+1), wherein i is an integer between 1 and N.

7. The electronic system of claim 6, wherein after the installation software has been installed, an instruction to find a $1^{st}$ electronic device set of the electronic device sets in one of the containing packages labelled with 2 will be generated.

8. The electronic system of claim 6, wherein after the $i^{th}$ electronic device set has been confirmed to be installed, an instruction to find an $(i+1)^{th}$ electronic device set of the electronic device sets in one of the containing packages labelled with (i+2) will be generated.

9. The electronic system of claim 8, wherein basic installation knowledge of the electronic system will be further provided.

10. The electronic system of claim 1, wherein the containing packages may be containing boxes or containing grids.

11. A method for instructing an installation of an electronic system, wherein the electronic system comprising a plurality of electronic device sets contained in a plurality of containing packages, wherein each of the containing packages contains one of the electronic device sets and labelled with a sequential number corresponding to an installation order of the electronic device set contained therein, and wherein the plurality of containing packages are contained in a packing box, the method comprising:
installing installation software, wherein downloading information related to the installation software for providing a plurality of installation instructions of sequentially installing the plurality of electronic device sets of the electronic system one by one is printed on a printed matter, wherein the electronic device sets need to be installed according to an installation order to collaboratively initiate a specific service provided by the electronic system, wherein the electronic system is a virtual reality system comprising a position tracking component set, a data transfer component set, a head-mounted display component set, and a controller component set, and wherein the printed matter is printed with a number of 1, which represents that the installation software needs to be downloaded before installing the electronic device sets; and providing the installation instructions of sequentially installing the electronic device sets one by one corresponding to the sequential numbers labelled on the containing packages after the installation software has been installed.

12. The method of claim 11, wherein the containing packages comprise a first containing package for containing the position tracking component set, a second containing package for containing the data transfer component set, a third containing package for containing the head-mounted display component set, and a fourth containing package for containing the controller component set, and wherein the first containing package, the second containing package, the third containing package, and the fourth containing package are sequentially labelled with the sequential numbers from 2 to 5.

13. The method of claim 12, wherein after the installation software has been installed, instructions with sequential numbers from 2 to 5 corresponding to the containing package will be provided step by step.

14. The method of claim 12, wherein after the position tracking component set, the data transfer component set, and the head-mounted display component set are sequentially installed, the installation software checks whether a connection status of the head-mounted display component set is normal;

if yes, a first notification for subsequently installing the controller component set will be generated accordingly; and if no, a second notification for checking whether the position tracking component set, the data transfer component set, and the head-mounted display component set are properly installed will be generated accordingly.

15. The method of claim 11, wherein a total number of the electronic device sets is N, and the sequential numbers labelled on the containing packages comprise a plurality of integers from 2 to (N+1).

16. The method of claim 15, wherein an $i^{th}$ electronic device set of the electronic device sets is contained in one of the containing packages labelled with (i+1), wherein i is an integer between 1 and N.

17. The method of claim 16, wherein the step of providing the installation instructions of sequentially installing the electronic device sets one by one corresponding to the sequential numbers labelled on the containing packages after the computing device has been installed with the installation software comprises:

after the installation software has been installed, an instruction to find a $1^{st}$ electronic device set of the electronic device sets in one of the containing packages labelled with 2 will be generated.

18. The method of claim 16, wherein the step of providing the installation instructions of sequentially installing the electronic device sets one by one corresponding to the sequential numbers labelled on the containing packages after the computing device has been installed with the installation software comprises:

after the $i^{th}$ electronic device set has been confirmed to be installed, an instruction to find an $(i+1)^{th}$ electronic device set of the electronic device sets in one of the containing packages labelled with (i+2) will be generated; and providing basic installation knowledge of the electronic system.

19. A computer program product for use in sequentially installing a plurality of electronic device sets of an electronic system, wherein the electronic system comprising a plurality of electronic device sets contained in a plurality of containing packages, wherein each of the containing packages contains one of the electronic device sets and labelled with a sequential number corresponding to an installation order of the electronic device set contained therein, and the plurality of containing packages are contained in a packing box, wherein downloading information related to the computer program product is printed on a printed matter, wherein the electronic device sets need to be installed according to an installation order to collaboratively initiate a specific service provided by the electronic system, wherein the electronic system is a virtual reality system comprising a position tracking component set, a data transfer component set, a head-mounted display component set, and a controller component set, and wherein the printed matter is printed with a number of 1, which represents that the installation software needs to be downloaded before installing the electronic device sets, the computer program product comprising an executable computer program mechanism embedded therein, the executable computer program mechanism comprising instructions for:

providing a plurality of installation instructions of sequentially installing the electronic device sets one by one corresponding to the sequential numbers labelled on the containing packages after the computing device has been installed with the installation software.

* * * * *